Dec. 21, 1926. 1,611,439.
J. F. HAVLICK
CHUCK
Filed Feb. 7, 1925
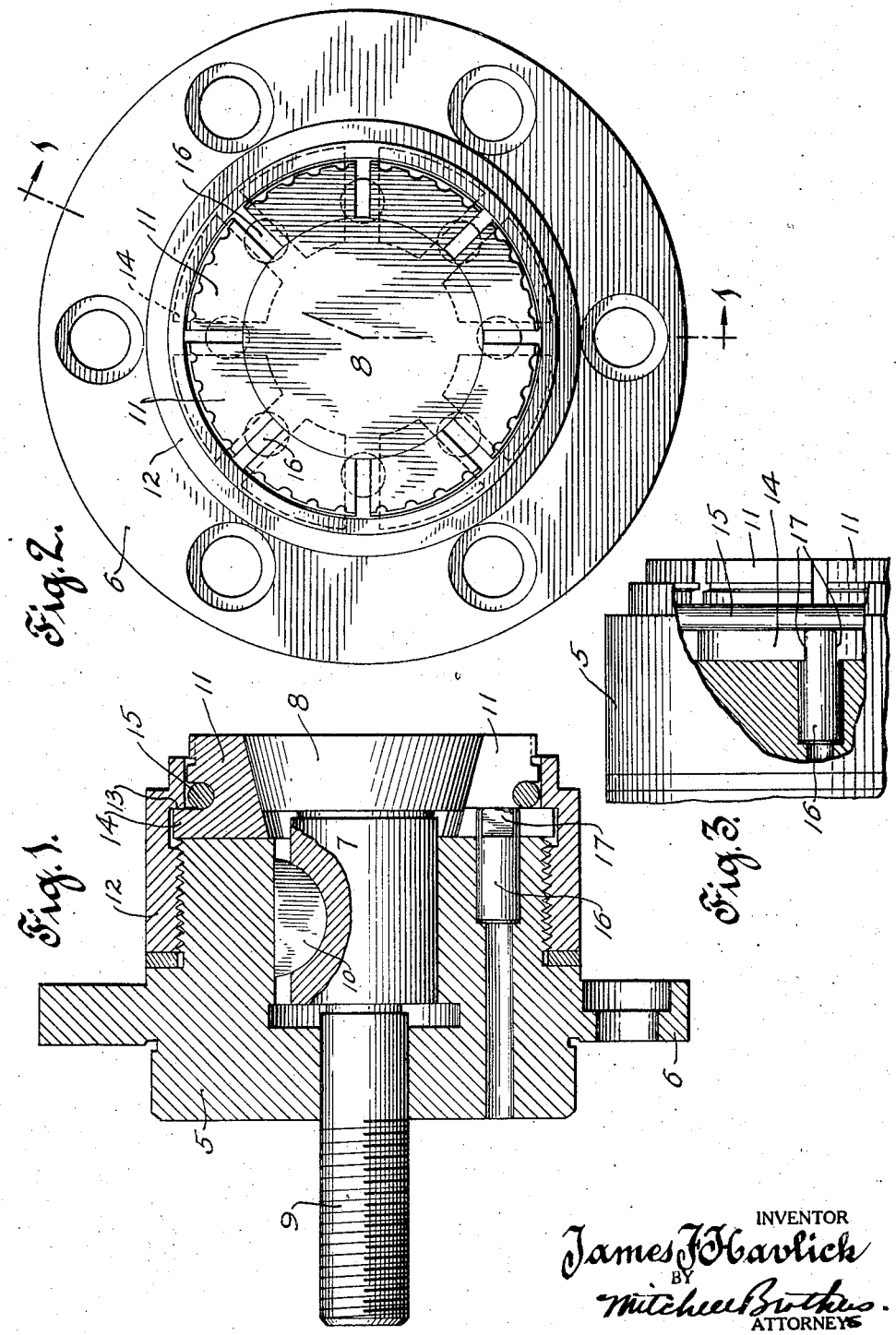

Patented Dec. 21, 1926.

1,611,439

UNITED STATES PATENT OFFICE.

JAMES F. HAVLICK, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

CHUCK.

Application filed February 7, 1925. Serial No. 7,525.

My invention relates to a chuck and is in the nature of an improvement on the chuck disclosed in my copending application Serial No. 712,937, filed May 13, 1924.

In a chuck as disclosed in my said copending application, it sometimes happens that the chuck jaws slip circumferentially on the chuck body and on the expander.

It is an object of my invention to generally improve the construction of a chuck and provide a chuck in which the jaws are positively caused to rotate with the chuck body.

In the drawings, which show for illustrative purposes only, a preferred form of the invention:

Fig. 1 is a sectional view through a chuck embodying features of my invention and taken substantially in the plane of the line 1—1 of Fig. 2;

Fig. 2 is a front end elevation of the chuck shown in Fig. 1;

Fig. 3 is a fragmentary detail view.

In said drawings, 5 indicates the body of a chuck which may be secured to the head stock of a lathe by means of bolts extending through the flange 6. The body of the chuck is preferably bored out to receive the sliding guide 7 of an expander for expanding the chuck jaws. The head portion 8 of the expander is tapered as indicated and is integral with or secured to the guiding portion 7. The expander may be operated by any suitable means through the rod 9, passing through the rear end of the chuck. It is preferable to cause the expander head and chuck body to rotate together and to that end I may employ a spline key 10 as indicated.

A plurality of chuck jaws 11—11 having inner faces corresponding in general to the form of the expander head 8 are held on the chuck body in any suitable manner as by means of the nut 12 having a shoulder 13 thereon positioned in front of projections or lugs 14 on the rear outer edges of the chuck jaws. The rear faces of the chuck jaws preferably lie flat against the front face of the chuck body and are held and guided thereby in their inward and outward movement. The chuck jaws are preferably provided with grooves on the outer sides in which a resilient ring 15 fits so that when the expander head is moved toward the right as viewed in Fig. 1, the contracting ring 15 will contract the jaws so as to permit of the application of the work article to the jaws.

Now if no means are provided to prevent it, the chuck jaws might slide on the chuck body and on the expander head, and to prevent this undesirable action, I provide means for positively causing the chuck jaws to rotate with the chuck body. One preferred means of accomplishing the above object is shown in the drawings, in which the chuck body is provided with bores to receive pins 16—16 therein. These pins are preferably equal in number to the jaws and may be positioned between adjacent chuck jaws so that during the rotation of the chuck body the pins 16—16 will engage one or the other, or both of the adjacent chuck jaws and positively cause the jaws to rotate with the chuck body. If desired, the pins 16—16 may be flattened off at opposite sides, as indicated at 17—17, for the purpose of giving a greater bearing surface between the pins and the chuck jaws. It is also desirable to have the chuck jaws quite closely adjacent each other when the work article is in position thereon, and when such jaws are to be positioned close together, I prefer to cut away the rear edge of each jaw slightly so as to provide an increased space for the pins 16—16, as will be clear from the drawings.

While the invention has been described in some detail, I do not wish to be confined to the form illustrated since changes may be made within the scope of the invention as defined in the appended claims.

I claim:

1. In a chuck, a chuck body, a plurality of chuck jaws guided on said body, a conical expander head for expanding said jaws, means extending rearwardly through said body for moving said expander head and guiding the same longitudinally of said body, a pin secured in the front of said chuck body and abutting at least one of said jaws laterally for preventing rotation of said jaw on said body.

2. In a chuck, a chuck body, a plurality of chuck jaws guided on said body, retaining means on said body for holding said jaws thereon, resilient means for urging said jaws to contracted position, a conical expander head for moving said jaws to expanded position, said body having a longitudinal bore therein, a guide portion on said expander head and fitting said bore to guide said expander head, means for preventing rotation of said expander head on said body, a draw rod extending rearwardly of said body for moving said expander head, and a plurality of longitudinally extending pins on said body, said pins engaging said jaws laterally to prevent rotation of said jaws on said chuck body.

JAMES F. HAVLICK.